United States Patent [19]

Späth et al.

[11] Patent Number: 4,612,421
[45] Date of Patent: Sep. 16, 1986

[54] METHOD OF AND TEST ARRANGEMENT FOR TESTING THE TRANSMISSION PATH WITHIN AN APPARATUS OF A MODULAR CONSTRUCTION FOR INTERRUPTIONS

[75] Inventors: Günther Späth, Happurg; Werner Zeder, Kronach, both of Fed. Rep. of Germany

[73] Assignee: U.S. Philips Corporation, New York, N.Y.

[21] Appl. No.: 665,269

[22] Filed: Oct. 26, 1984

[30] Foreign Application Priority Data

Oct. 28, 1983 [DE] Fed. Rep. of Germany ....... 3339155
Oct. 28, 1983 [DE] Fed. Rep. of Germany ....... 3339156

[51] Int. Cl.⁴ ............................................. H04M 3/28
[52] U.S. Cl. ............................. 179/175; 179/175.2 R
[58] Field of Search ......... 179/175, 175.2 R, 175.2 C, 179/175.1 R, 175.21, 175.23, 175.25, 175.3 R, 175.3 F; 370/14; 371/22

[56] References Cited

U.S. PATENT DOCUMENTS 3,937,908  2/1976  Funk et al. .................. 179/175.2 R Primary Examiner—Stafford D. Schreyer
Attorney, Agent, or Firm—Thomas A. Briody; William J. Streeter; Edward W. Goodman

[57] ABSTRACT

Apparatuses which are, for example, used in telephone central exchanges or transmission arrangements have become increasingly more complicated. Interruptions in the transmission path within the apparatus can be detected with the aid of a test arrangement which comprises at least one transmitter, at least one receiver, and a control device. To that end, the transmitted test signal is compared with the received test signal. To reduce the cost and design efforts of the test arrangement and to avoid the use of switches which are susceptible to trouble, transmitters or receivers are arranged in the modules at the inputs or outputs of the modules. Signals from the control device can also be used for producing the test signal and to control the evaluation. The control device ends the test cycle when the transmitted test signal is received in the receiver. The transmission of useful signals and the test signal can be effected simultaneously.

8 Claims, 6 Drawing Figures

4,612,421

METHOD OF AND TEST ARRANGEMENT FOR TESTING THE TRANSMISSION PATH WITHIN AN APPARATUS OF A MODULAR CONSTRUCTION FOR INTERRUPTIONS

BACKGROUND OF THE INVENTION

The invention relates to a method of testing the transmission path, within an apparatus of a modular construction, for interruptions, using a test arrangement comprising at least one transmitter, at least one receiver and a control device.

Apparatuses which are used in, for example, contemporary message transmission systems become increasingly more complicated because of the fact that a large number of performance features of such message transmission systems must be made available for the user. A criterion to judge the performance of the message transmission system is its availability to the user.

This availability is defined as the quotient of the average interference-free time MTBF and the sum of the average interference-free time MTBF and the mean value for the time spent in repairing the message transmission system (MTTR). The availability is also the probability, expressed in a percentage figure, of finding a network or a portion of the network, at a predetermined instant, in a state in which it is in working order. The network (transmission system) is the totality of exchanges, terminal stations and transmission arrangements including the transmission paths.

In order to obtain a large number of performance features within the message transmission system, the apparatuses used therein consist of an ever increasing number of modules. Usually this increase results in a lower mean value MTBF. In addition, a large number of modules in the apparatus usually result in longer repair times, increases the mean value MTTR and imposes more stringent requirements on the maintenance staff. Together, the mean values MTBF and MTTR decrease its availability for the user. If specific measures are taken to increase the mean value MTBF, the circuit cost and design effort for the apparatus become larger and, consequently the apparatus becomes more expensive. To reduce the cost of the apparatus and to accomplish an improved availability for the user, efforts are usually made to decrease the repair time, that is to say a decrease of the mean value MTTR. The time spent in repairing the apparatus can be reduced by providing the apparatus with diagnostic units and test arrangements. An important object for such test arrangements used in telephone exchange systems or telephone transmission systems is the testing of lines, through which the message (for example a speech signal) is transmitted, for interruptions.

FIG. 1 shows a prior art test arrangement for testing the transmission path within a modular apparatus, for interruptions in the transmission path. In the apparatus, the test arrangements, which comprise a test signal transmitter, a test signal receiver, a control device and a coupling field, are arranged in the central station. Testing for line interruptions can, for example, be effected by switching the inputs and outputs of the modules to the test arrangement. In small apparatuses, this test arrangement may constitute a comparatively large portion of the total cost and design efforts for the apparatus.

If the change-over of the inputs or outputs of the modules is effected with the aid of relays, the cost for the test arrangement is not only significantly increased by the relays also reduce the means value MTBF of the modules. If the relay is replaced by a different switching device (for example a transistor), it must satisfy very high requirements as regards the symmetry of the transmission path and the overvoltage resistance (of the transistor).

SUMMARY OF THE INVENTION

The invention has for its object to provide measures by means of which it is possible to detect an interruption in the transmission path within an apparatus of a modular construction, in a reliable way, at low cost and with simple means.

This object is accomplished in a method of testing a transmission path, characterized in that in a test cycle, the control device sequentially drives the transmitters which are included in each module and the transmitted test signals are received by the receiver arranged at the end of the transmission path in a module and being controlled by the control device, and that the control device ends the test cycle when a transmitted test signal is received by the receiver.

The cost for the test arrangement forms only a fraction of the total cost and design efforts for the apparatus. For the generation of a test signal and a control of the evalutaion, it is possible to use also the signals from the control device. A further advantage is obtained when the MTBF-value is substantially not decreased by the test arrangement. The compromise as regards the testing depth does hardly play a part when the types of failures of the transmission path are known with a high probability, so that a testing depth with which these types of faults can be recognized without fail is sufficient. A further advantage is the fact that no switching arrangement for disconnecting the line connected to the apparatus and also the lines between the modules and the apparatus, and no coupling arrangement in the test arrangement are required.

DESCRIPTION OF THE DRAWINGS

The invention will now be described in greater detail by way of example with reference to the embodiments shown in the accompanying drawings, in which.

DESCRIPTION OF THE PREFERRED EMBODIMENTS

Figure 1:
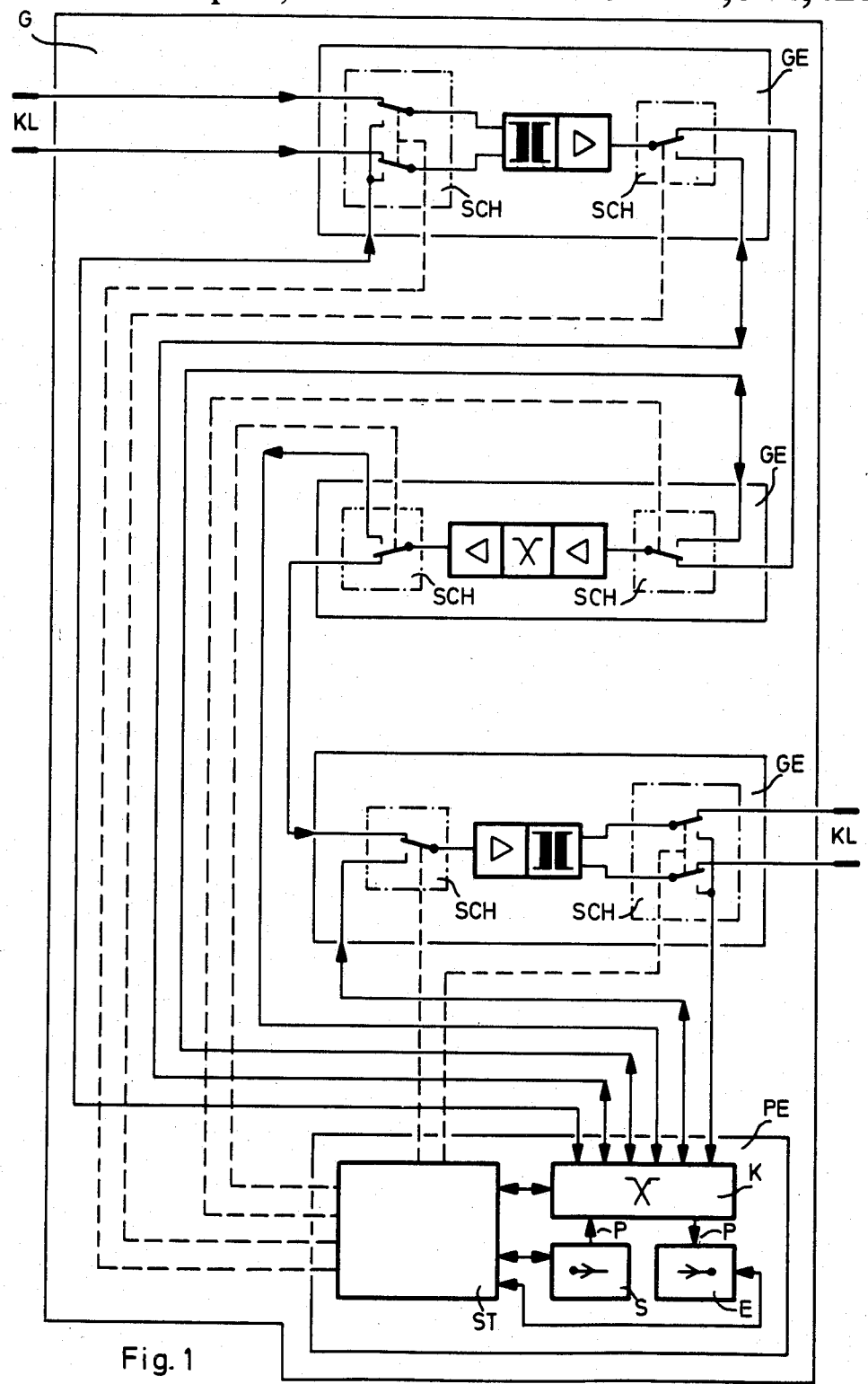
FIG. 1 shows a prior art test arrangement comprising switching devices at the inputs and outputs respectively of the modules, and comprising a coupling field.

FIG. 1 shows an apparatus G which comprises a plurality of modules GE. The apparatus G may form part of a telephone exchange system or may be a telephone transmission system. To test the transmission path within the apparatus G for interruptions, a test arrangement PE is provided which comprises a coupling device K, a control device ST, a transmitter S and a receiver E. In each module GE switching devices SCH are arranged at the inputs and the outputs, respectively, by means of which a change-over to the test arrangement PE can be effected for the purpose of feeding-in test signals P. The control device ST opens and closes the switching devices SCH and switches-through the transmission path for the test signals P within the coupling device K. FIG. 1 shows the control of the switching devices SCH for effecting the change-over operation by means of broken lines.

In the modules GE, circuit portions are arranged to enable the required functions to be effected within the central exchange or within the transmission arrangement. When the apparatus G is used in an exchange, telephone lines, through which, for example, speech signals are transmitted, are connected to terminals KL of the apparatus G. In the apparatus G, switch-through of feeder lines to corresponding subscriber lines of the telephone line is effected. At the line interface to the telephone lines, transformers are arranged in the first and the last module GE.

An Interruption in the transmission path within the apparatus G can be recognized from the fact that the transmitted test signal P is not received by the receiver E. By dividing the transmission path into individual line sections, the place of the line interruption can be determined unambiguously. In addition to the high circuit cost and design effort for the switching devices SCH and their control, there is a further disadvantage, namely that during the test no useful signals (for example speech signals) can be transmitted through the transmission path within the apparatus G.

The test method according to the invention is based on the recognition that the probability of an interruption in the handling of a transmission in the direction of the telephone line is small. The receivers which are provided at the beginning and the end of the transmission path within the apparatus G satisfy the requirements as regards symmetry and overvoltage protection. As an interruption in the transformer winding is less probable, feeding-in of the test signal P and coupling it out can be effected in a particularly simple way. Furthermore, a pulse or a pulse train, which, during the test procedure may occur as a brief "interference" or as brief "noise" on the telephone line, can be used as the test signal P. Disconnecting the telephone line during the test procedure is not required. The control device ST in the apparatus G is programm-controlled, so that, advantageously, signals generated already in the control device ST, preferably pulses or pulse trains, can also be used to produce the test signal P.

Figure 2:
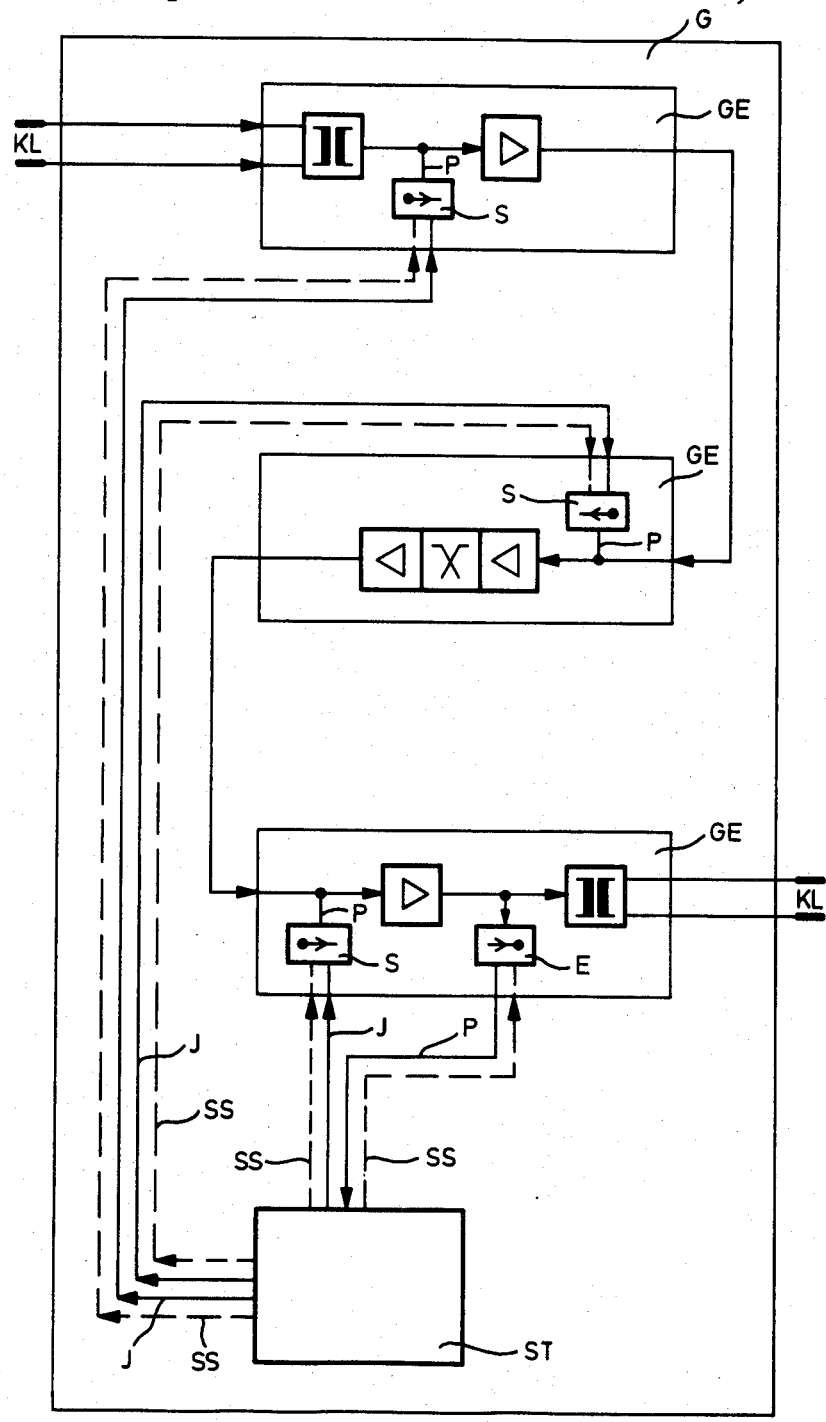
FIG. 2 shows a first embodiment of the test arrangement of the invention

For the first embodiment, shown in FIG. 2, of the test arrangement according to the invention, a transmitter S is arranged at the input of each module GE (at the beginning of the transmission path to the transformer). In a test cycle, the control device ST sequentially drives the transmitters S. The test cycle may, for example, start with the transmission of a pulse via the whole transmission path of the apparatus G. At the end of the transmission path a receiver E is arranged in a module GE, which receiver is controlled by the control device ST. Driving the receivers E or transmitters S is effected with the aid of control signals SS from the control device ST. For the generation of the test signal in the transmitter S, a control signal SS and also a pulse J (which is combined in the transmitter S with the control signal SS) which appear at the output of the control device ST, can also be used.

If, in the receiver E, the transmitted test signal P is received, the test cycle is ended. If the test signal P is not received by the receiver E, then the control device ST does not drive the transmitter S in the first module GE, but rather the transmitter S of the subsequent module GE in the transmission path. Shortening of the transmission path in this way is continued until the transmitted test signal P is received in the receiver E. The module GE (or the line section of the transmission path) before the last test step is identified as being defective.

Figure 3:
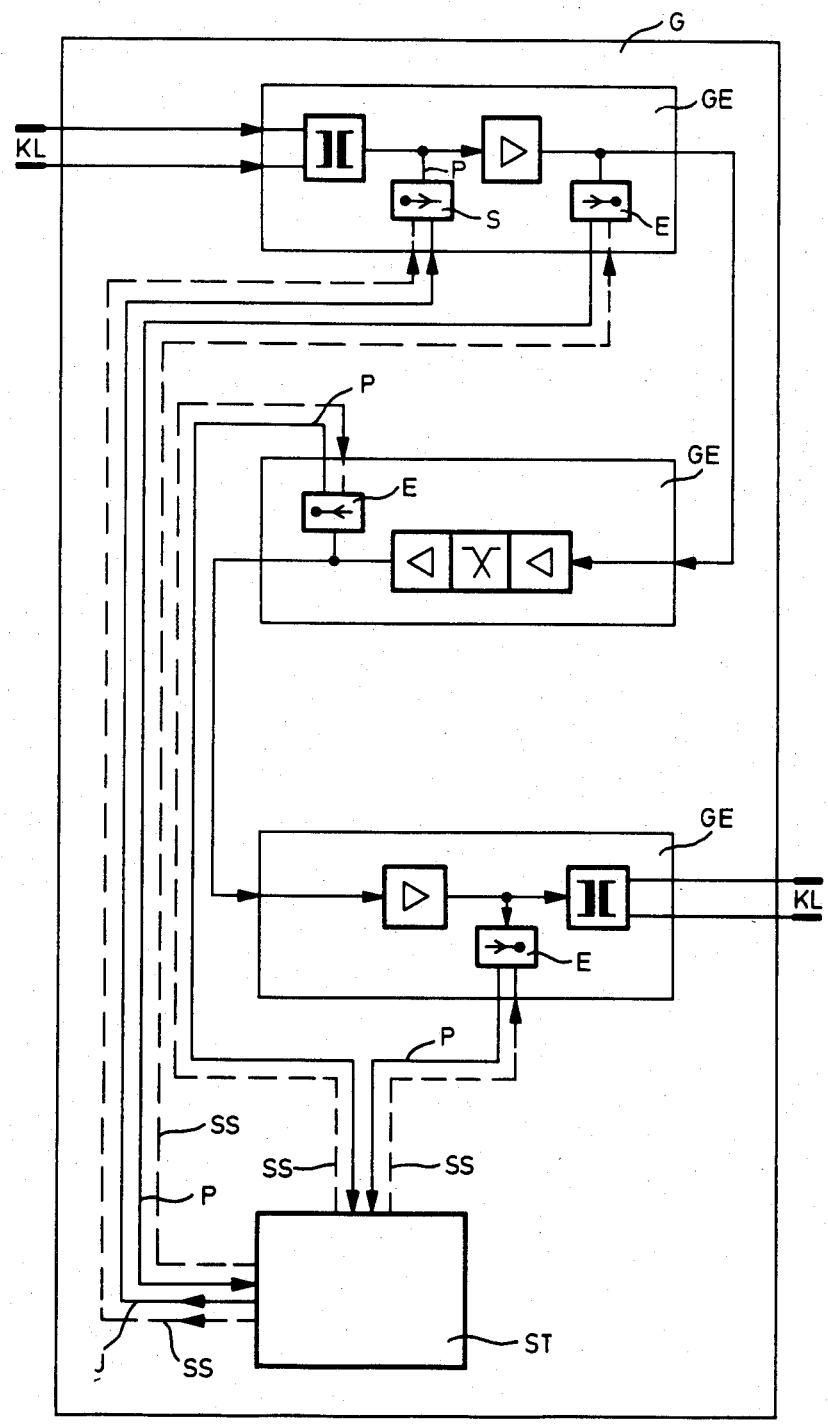
FIG. 3 a second embodiment of the test arrangement in the apparatus for performing the test method according to the invention.

FIG. 3 shows, for the second embodiment of the test arrangement, a transmitter S provided at the beginning of the transmission path within the apparatus G and a receiver E provided at the output of each module GE. The test cycle is carried out in a similar way as described with reference to the test arrangement of FIG. 2. Usually the cost and design effort for the receiver E exceed those for the transmitter S.

Figure 4:
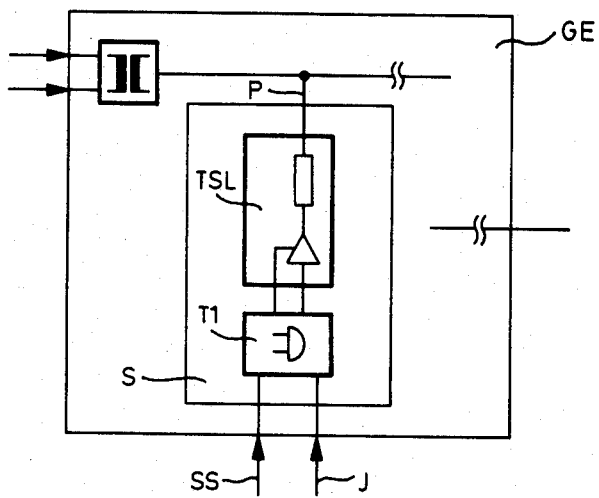
FIG. 4 shows an embodiment of a transmitter.

FIG. 4 shows an embodiment for a transmitter S. The transmitter S comprises a first gate circuit T1 to which a control signal SS, produced by the control device ST, and a pulse J are applied. The gate circuit T1 combines the control signal SS with the pulse J and applies the combined signals to a tristate logic circuit TSL. The test signal P is available at the output of the tristate logic circuit TSL. The cost and design effort for producing the test signal P in the transmitter S only require low-priced logic components.

The generated test signal P is characterized by the pulse height (amplitude) and the pulse duration. If the transmission path within the apparatus G is d.c. coupled, that is to say terminated with transformers only at the output and the input (terminals K) of the line, then the pulse height can be chosen such that the tristate logic circuit TSL produces a d.c.-voltage level at the copper resistor of the output transformer. The pulse duration of the test signal P can be chosen optionally, and, consequently, also the instant at which the receiver E is interrogated.

No special time conditions must be fulfilled for the central control device ST. Because of the presaturation of the output transformers, inteferences which are coupled-in via the telephone line during the test cycle are additionally attenuated.

Figure 5:
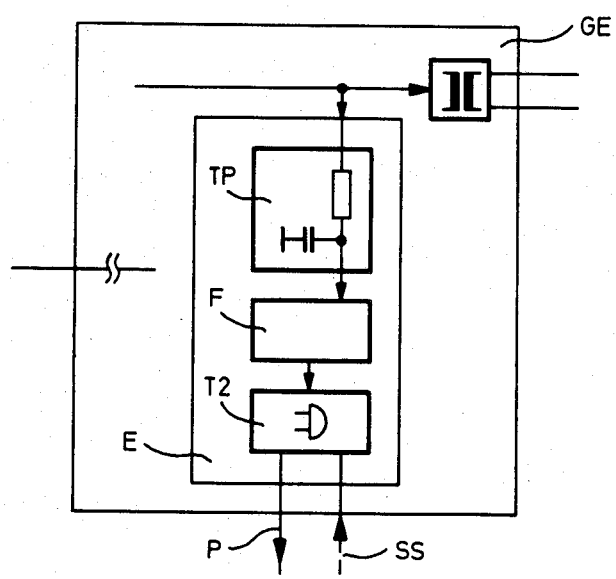
FIG. 5 shows a first embodiment of a receiver.

FIG. 5 shows a window comparator F which is arranged in the receiver E and whose output signal is sampled by the control device ST at predetermined instants.

The window comparator F is a circuit arrangement which checks whether, for example, the level of the applied signals are contained or not contained within two predetermined reference values (that is to say within the window). Depending on whether this level is located within or not within these reference values, the output signal will assume one or the other logic value.

The receiver E comprises a low-pass filter TP to which the test signal P of the transmitter S is applied. The window comparator F is connected to the low-pass filter TP and also to a second gate circuit T2. The gate circuit T2 in the receiver E is so driven by means of a control signal SS of the control device ST that the time conditions for the sampling operation are satisfied. The sampled test signal P appears at the output of the second gate circuit T2 for the case in which there is no interruption in the transmission path.

As the transmission path to the telephone line and within the apparatus G is not interrupted, interferences may be coupled-in so that in addition to a multi-sampling operation of the receiver E, the test signal P, that is to say the pulse duration and the pulse height, and also the window width and the sampling instant can be adequately fixed.

If the transmission path within the apparatus G is not d.c.-coupled, then the pulse duration of the test signal P must not exceed the lower cut-off frequency of the transmission path. As the test signal, a pulse may be selected whose frequency is located in the transmission band of the transmission path. The time conditions which determine the pulse duration and the sampling instant of the receiver E result from the lower cut-off frequency of the transmission path. If the lower cut-off frequency is, for example, located at some dozens of Hz, the time conditions resulting therefrom for the control device ST are feasible.

Figure 6:
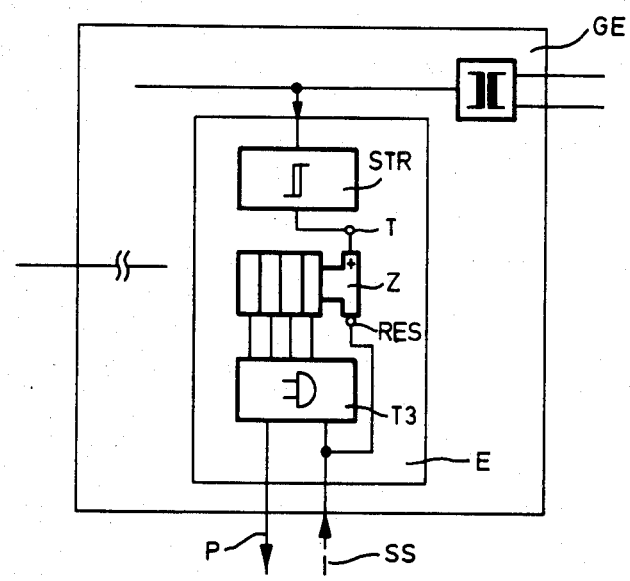
FIG. 6 shows a second embodiment of a receiver according to the invention.

Since performing the test is an additional object for the control device ST, it is not always possible to satisfy the time conditions at a lower cut-off frequency higher than some hundreds of Hertz. FIG. 6 shows a further embodiment of a receiver E.

The receiver E comprises a Schmitt trigger STR to which the test signal P, preferably a pulse train, is applied in the direction towards the transmitter S. The binary output signal of the Schmitt trigger STR assumes, for example, the logic value 1 when an input signal (test signal P) exceeds a certain threshold value (voltage U1). The output signal continued to have the logic value 1 until the test signal P exceeds a second threshold value (voltage U2).

The pulse edges of the test signal P are evaluated by means of the Schmitt trigger STR and a counter Z arranged in the receiver E. The output signal of the Schmitt trigger STR is applied to the counting input (denoted by + in the control block of the counter Z) of the counter Z. The outputs of the counter Z are connected to a third gate circuit T3. The control signal SS produced by the control device ST is applied to the gate circuit T3 and to a reset input RES of the counter Z. The counter Z is reset when the control signal SS assumes the logic value 0. Whether the test signal P is present can be determined from the counting position of the counter Z.

This embodiment has the advantage that the time conditions for the control device ST can be easily satisfied and that the transmission behavior of the transmission path hardly influences the evaluation.

If the circuit cost and design effort for the receiver E are compared with those for the transmitter S, then the circuit cost and design efforts for the transmitter S are less than those for the receiver E. Compared with a test arrangement comprising a plurality of switching devices in the modules, the total circuit cost and design efforts for the test arrangement are lower independent thereof.

What is claimed is:

1. A method of testing the transmission path within an apparatus of a modular construction, for interruptions, using a test arrangement comprising at least one transmitter, at least one receiver and a control device, characterized in that in a test cycle, the control device sequentially drives transmitters which are included in each module, and the transmitted test signals are received by the receiver arranged at the end of the transmission path in a module and being controllable by the control device, and that the control device ends the test cycle when a transmitted test signal is received by the receiver.

2. A method of testing the transmission path within an apparatus of a modular construction, for interruption, using a test arrangement comprising at least one transmitter, at least one receiver and a control device, characterized in that in a test cycle, the control device consecutively drives receivers arranged in each module, that the transmitter which is arranged at the beginning of the transmission path in a module and is controllable by the control device, transmits the test signal and that the control device ends the test cycle when one of the receivers receives the test signal.

3. A method as claimed in claim 1 or 2, characterized in that as the test signal, a pulse or a pulse train is used, for which purpose signals of the control device are combined and that the test signal is transmitted via the transmission path together with useful signals or during the transmission interval of useful signals.

4. A test arrangement for testing a transmission path within an apparatus of a modular construction, for interruptions, characterized in that said test arrangement comprises a transmitter arranged at an input of each module in said transmission path for generating a test signal, a receiver arranged at an output of the module at the end of the transmission path for receiving said test signal, and a control device coupled to each transmitter and said receiver, for sequentially energizing said transmitters and for terminating a test sequence when said receiver receives said test signal.

5. A test arrangement for testing a transmission path within an apparatus of a modular construction, for interruptions, characterized in that said test arrangement comprises a transmitter arranged at an input of a module at the beginning of said transmission path for generating a test signal, a receiver arranged at an output of each module in said transmission path for receiving said test signal, and a control device coupled to said transmitter and each receiver for sequentially energizing said receivers and for terminating a test sequence when one of said receivers receives said test signal.

6. A test arrangement as claimed in claim 4 or 5, characterized in that said transmitter comprises a gate circuit for receiving a pulse signal and a pulse-shaped control signal from said control device, and a tristate logic circuit, including a resistance network, connected to an output of said gate circuit, and test signal appearing at an output of said gate circuit.

7. A test arrangement as claimed in claim 4 or 5, characterized in that said receiver comprises a low-pass filter to wich said test signal is applied, a window comparator connected to an output of said low-pass filter, and a gate circuit having a first input connected to an output of said window comparator, a second input for receiving a pulse-shaped control signal from said control device, and an output.

8. A test arrangement as claimed in claim 4 or 5, characterized in that said receiver comprises a Schmitt-trigger to which said test signal is applied, a counter having a clock pulse input connected to an output of said Schmitt-trigger, and a gate circuit connected to outputs of said counter, a pulse-shaped control signal generated by said control device being applied to a reset input of said counter and also to said gate circuit.

* * * * *